(12) United States Patent
Kimba Dit Adamou et al.

(10) Patent No.: US 11,570,770 B2
(45) Date of Patent: Jan. 31, 2023

(54) METHOD AND DEVICE FOR REQUESTING FOR AND SCHEDULING RELAY RESOURCE

(71) Applicant: VIVO MOBILE COMMUNICATION CO., LTD., Guangdong (CN)

(72) Inventors: Boubacar Kimba Dit Adamou, Chang'an Dongguan (CN); Xueming Pan, Chang'an Dongguan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 205 days.

(21) Appl. No.: 17/039,533

(22) Filed: Sep. 30, 2020

(65) Prior Publication Data

US 2021/0022133 A1    Jan. 21, 2021

Related U.S. Application Data

(63) Continuation of application No. PCT/CN2019/080987, filed on Apr. 2, 2019.

(30) Foreign Application Priority Data

Apr. 3, 2018    (CN) .......................... 201810292258.1

(51) Int. Cl.
```
H04W 72/04      (2009.01)
H04W 72/08      (2009.01)
H04W 84/04      (2009.01)
```
(52) U.S. Cl.
CPC ..... *H04W 72/0433* (2013.01); *H04W 72/082* (2013.01); *H04W 84/047* (2013.01)

(58) Field of Classification Search
CPC .......... H04W 72/0433; H04W 72/082; H04W 84/047
See application file for complete search history.

(56) References Cited

U.S. PATENT DOCUMENTS

| | | | |
|---|---|---|---|
| 2008/0031197 | A1 | 2/2008 | Wang et al. |
| 2009/0003260 | A1 | 1/2009 | Guo et al. |
| 2011/0128893 | A1 | 6/2011 | Park et al. |

(Continued)

FOREIGN PATENT DOCUMENTS

| | | |
|---|---|---|
| CN | 101335971 A | 12/2008 |
| CN | 101523945 A | 9/2009 |

(Continued)

OTHER PUBLICATIONS

European Search Report dated May 17, 2021 as received in application No. 19780929.6.

(Continued)

*Primary Examiner* — Habte Mered
(74) *Attorney, Agent, or Firm* — Maschoff Brennan

(57) ABSTRACT

A method of requesting a relay resource, a scheduling method and a device are provided. The method of requesting a relay resource includes: sending a resource request message to a network device to which a relay device accesses; the resource request message carries at least one of following resource requirements information: backhaul resource requirement information of the relay device, and access link resource requirement information of the relay device.

17 Claims, 3 Drawing Sheets

Sending a resource request message to a network device to which a relay device accesses — S210

(56) References Cited

U.S. PATENT DOCUMENTS

| | | | |
|---|---|---|---|
| 2012/0069790 A1* | 3/2012 | Chung | H04L 5/0094 |
| | | | 370/329 |
| 2015/0016351 A1 | 1/2015 | Lee | |
| 2019/0014533 A1* | 1/2019 | Abedini | H04W 48/14 |
| 2019/0199424 A1* | 6/2019 | Li | H04W 56/0045 |
| 2019/0215055 A1* | 7/2019 | Majmundar | H04B 7/15521 |
| 2020/0059901 A1* | 2/2020 | Larsson | H04W 72/042 |

FOREIGN PATENT DOCUMENTS

| | | |
|---|---|---|
| CN | 101827449 A | 9/2010 |
| CN | 101909306 A | 12/2010 |
| CN | 103052132 A | 4/2013 |
| CN | 103813388 A | 5/2014 |
| CN | 104283654 A | 1/2015 |
| CN | 106452703 A | 2/2017 |
| CN | 106912078 A | 6/2017 |
| EP | 2296420 A1 | 3/2011 |
| EP | 3125643 A1 | 2/2017 |
| WO | 2016186995 A1 | 11/2016 |
| WO | 2017/122977 A1 | 7/2017 |

OTHER PUBLICATIONS

"On RAN Architecture for IAB relaying in NR" 3GPP TSG-RAN3 Meeting #99, R3-181351, Athens, Greece, Feb. 26-Mar. 2, 2018. Intel Corporation.

Chinese Office Action dated Apr. 6, 2021 as received in application No. 201810292258.1.

Written Opinion and International Search Report in Application No. PCT/CN2019/080987 dated Oct. 15, 2020.

* cited by examiner

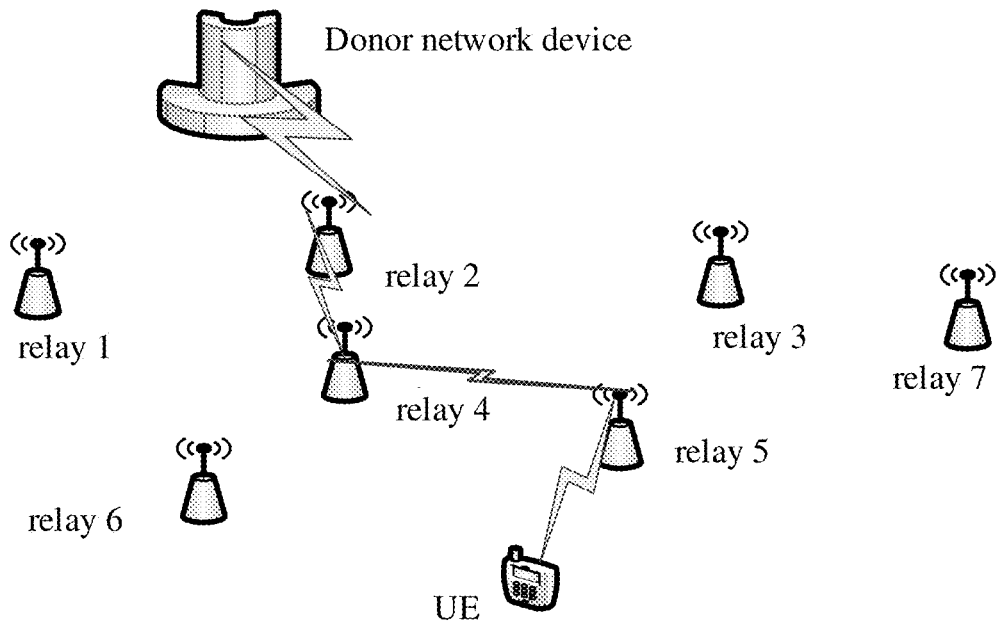

Fig.1

```
┌─────────────────────────────────────────────────────────────┐  ┌─ S210
│ Sending a resource request message to a network device to   │/
│ which a relay device accesses                               │
└─────────────────────────────────────────────────────────────┘
```

Fig.2

```
┌─────────────────────────────────────────────────────────────┐  ┌─ S310
│ Receiving a resource request message of a relay device      │/
└─────────────────────────────────────────────────────────────┘
                              │
                              ▼
┌─────────────────────────────────────────────────────────────┐  ┌─ S320
│ Scheduling a resource for the relay device based on the     │/
│ resource request message                                    │
└─────────────────────────────────────────────────────────────┘
```

Fig.3

METHOD AND DEVICE FOR REQUESTING FOR AND SCHEDULING RELAY RESOURCE

CROSS-REFERENCE TO RELATED APPLICATION

This application is a continuation application of a PCT Application No. PCT/CN2019/080987 filed on Apr. 2, 2019, which claims a priority to Chinese Patent Application No. 201810292258.1 filed on Apr. 3, 2018, the disclosures of which are incorporated in their entirety by reference herein.

TECHNICAL FIELD

The present disclosure relates to the field of communications, in particular, relates to a method and a device of requesting for a relay resource, and a method and a device of scheduling a relay resource.

BACKGROUND

Relay (Relay) technology is to add one or more relay nodes between a base station and a terminal, the one or more relay nodes are responsible for forwarding a wireless signal for one or more times, i.e., the wireless signal has to go through multiple hops before reaching the terminal. Taking a simpler two-hop relay as an example, a link between a base station and a terminal is divided into a link between a base station and a relay station and a link between the relay station and terminal, so that there is an opportunity to replace a poor quality link with two superior quality links, to obtain a larger link capacity and better coverage.

It is researched to use a wireless relay as a backhaul in 5G technology. Wireless relay backhaul technology also includes adoption of a wireless backhaul link above 6 GHz. The higher a network frequency band is, the shorter the transmission distance of wireless backhaul is. In order to effectively achieve better multiple transmissions, a distance between wireless backhauls will be shorter and deployment thereof will be denser. An integrated access and backhaul (Integrated Access and Backhaul, IAB) device is a relay device in the 5G technology. The IAB accesses a core network through a donor integrated access and backhaul (Donor IAB, DIAB) device. The DIAB may be understood as a base station by which the IAB access the core network. When a new integrated access backhaul (IAB) device is deployed to a network or a UE resource demand of an IAB continues to rise, the IAB needs to request more resources from the donor integrated access backhaul (Donor IAB, DIAB) device. There is no provision for IAB resource scheduling in related art.

SUMMARY

An objective of the embodiments of the present disclosure is to provide a method and a device of requesting a relay resource and a method and a device of scheduling, to ensure a load or a link quality of a relay device.

In the first aspect, a method of requesting a relay resource is provided. The method is applied to a relay device, and the method includes: sending a resource request message to a network device to which a relay device accesses, wherein the resource request message carries at least one of the following resource requirements information: backhaul resource requirement information of the relay device, and access link resource requirement information of the relay device.

In a second aspect, a method of scheduling a relay resource is provided. The method is applied to a network device to which a relay device accesses and includes: receiving a resource request message of a relay device, wherein the resource request message carries at least one of following resource requirements information: backhaul resource requirement information of the relay device, and access link resource requirement information of the relay device; scheduling a resource for the relay device based on the resource request message.

In a third aspect, a relay device is provided. The relay device includes: a sending module used to send a resource request message to a network device to which the relay device accesses, wherein the resource request message carries at least one of the following resource requirements information: backhaul resource requirement information of the relay device, and access link resource requirement information of the relay device.

In a fourth aspect, a network device is proposed. The network device includes: a receiving module, used to receive a resource request message of a relay device, wherein the resource request message carries at least one of following resource requirement information: backhaul resource requirement information of the relay device, and access link resource requirement information of the relay device; and a scheduling module, used to schedule a resource for the relay device based on the resource request message In a fifth aspect, a relay device is provided. The relay device includes a storage, a processor, and a computer program stored on the storage and executable by the processor, wherein when the computer program is executed by the processor, the processor implements steps of the method according to the first aspect.

In a sixth aspect, a network device is provided. The network device includes a storage, a processor, and a computer program stored on the storage and executable by the processor, wherein when the computer program is executed by the processor, the processor implements steps of the method according to the second aspect.

In a seventh aspect, a computer-readable storage medium is provided, wherein a computer program is stored on the computer-readable storage medium, and when the computer program is executed by a processor, the processor implements steps of the method according to the first aspect.

In an eighth aspect, a computer-readable storage medium is provided, wherein a computer program is stored on the computer-readable storage medium, and when the computer program is executed by a processor, the processor implements steps of the method according to the second aspect.

In the embodiments of the present disclosure, a network device to which a relay device accesses is requested to configure a relay resource of the relay device, thereby effectively ensuring the load or the link quality of the relay device and improving robustness of relay communication.

BRIEF DESCRIPTION OF THE DRAWINGS

Drawings described here are used to provide a further understanding of the present disclosure and constitute a part of the present disclosure. Exemplary embodiments of the present disclosure and their descriptions are used to explain the present disclosure, but do not constitute an improper limitation of the present disclosure. In the drawings:

FIG. 1 is a schematic diagram of an application scenario of an embodiment of the present disclosure.

FIG. 2 is a flowchart of a method of requesting a relay resource according to an embodiment of the present disclosure.

FIG. 3 is a flowchart of a method of scheduling a relay resource according to an embodiment of the present disclosure.

DETAILED DESCRIPTION

Figure 4:
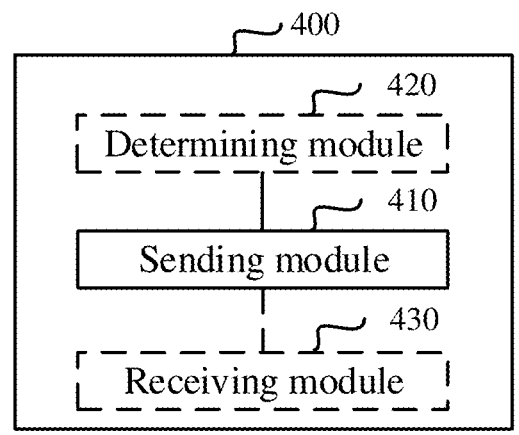
FIG. 4 is a schematic structural diagram of a relay device according to an embodiment of the present disclosure.

Technical solutions in the embodiments of the present disclosure will be described clearly and completely with reference to the accompanying drawings in the embodiments of the present disclosure. Obviously, the described embodiments are part of the embodiments of the present disclosure, rather than all of the embodiments. Based on the embodiments in the present disclosure, all other embodiments obtained by those of ordinary skill in the art without creative work shall fall within the protection scope of the present disclosure.

The technical solution of the present disclosure may be applied to various communication systems, such as: a global system of mobile communication (Global System of Mobile communication, GSM), a code division multiple access (Code Division Multiple Access, CDMA) system, and a wideband code division multiple access (Wideband Code Division Multiple Access, WCDMA) system, a general packet radio service (General Packet Radio Service, GPRS) system, a Long Term Evolution (Long Term Evolution, LTE)/a long term evolution advanced (Long Term Evolution advanced, LTE-A), an NR (New Radio), and the like.

User equipment (User Equipment, UE), also called mobile terminal (Mobile Terminal), mobile user equipment, etc., may be connected to one or more core networks via, for example, a radio access network (Radio Access Network, RAN) for communication. The user equipment may be a mobile terminal, such as a mobile phone (or a "cellular" phone) and a computer with a mobile terminal. For example, the user equipment may be a portable, a pocket-sized, a handheld, a computer in-built or a vehicle-mounted mobile device, which exchanges language and/or data with a wireless access network.

The base station may be a base station (Base Transceiver Station, BTS) in the GSM or the CDMA, a base station (NodeB) in the WCDMA, or an evolved base station (evolutional Node B, eNB or e-NodeB) in the LTE or a 5G base station (gNB), which is not limited in the present disclosure. For convenience of description, following embodiments take the gNB as an example for description.

The technical solutions provided by the embodiments of the present disclosure will be described in detail below with reference to the accompanying drawings.

It should be understood that in a communication with a relay, the communication between a base station and a terminal device needs to be forwarded one or more times, that is, a wireless signal must go through multiple hops before reaching the terminal device from the base station, or reaching a large base station from the terminal device to.

FIG. 1 is a schematic diagram of an application scenario in an embodiment of the present disclosure. As shown in FIG. 1, a wireless signal of a UE in FIG. 1 needs to pass through a relay 5, a relay 4, and a relay 2 before reaching a donor (Donor) network device in FIG. 1. The donor network device is a device by which a relay device accesses a core network, and may be understood as a base station of the relay device. The following describes a method and a device of requesting a relay resource, a method and a device of scheduling a relay resource with reference to FIG. 1.

FIG. 2 is a flowchart of a method of requesting a relay resource according to an embodiment of the present disclosure. The method in FIG. 2 is applied to a relay device. The method includes S210.

S210: sending a resource request message to a network device to which a relay device accesses.

The resource request message carries at least one of the following resource requirements information: backhaul resource requirement information of the relay device; access link resource requirement information of the relay device.

It should be understood that, in the embodiment of the present disclosure, the resource request message is used to request a backhaul resource from the network device to which the relay device accesses.

Taking FIG. 1 as an example, the relay 5 may request a backhaul resource from the relay 4, the relay 4 may request a backhaul resource from the relay 2, and the relay 2 may request a backhaul resource from the donor network device.

Of course, it should be understood that the relay 4 may request a resource from the relay 2 based on resources required by all devices accessing the relay 4; the relay 2 may request the backhaul resource from the donor network device based on resources required by all devices accessing the relay 2.

Optionally, in some embodiments, the relay device is an integrated access and backhaul (Integrated Access and Backhaul, IAB) device, and the network device is a donor IAB (Donor IAB, DIAB) device. For example, the relay device is the relay 2 in FIG. 1, and the network device is the donor network device in FIG. 1.

Optionally, in some embodiments, the relay device is an IAB device, and the network device is an IAB device. For example, the relay device is the relay 4 in FIG. 1, and the network device is the relay 2 in FIG. 1.

In the embodiments of the present disclosure, the network device to which the relay device accesses requests to configure a relay resource of the relay device, thereby effectively ensuring a load or a link quality of the relay device and improving robustness of relay communication.

Optionally, in some embodiments, the backhaul resource requirement information of the relay device includes at least one of the following: a backhaul resource from the network device to the relay device in a time window; a backhaul resource from the relay device to the network device in a time window.

It should be understood that the resource here may include a time-domain resource, a frequency-domain resource, an air-interface resource, and so on.

It should be understood that a link from the network device to the relay device is a downlink of the backhaul of the relay device; a link from the relay device to the network device is an uplink of the backhaul of the relay device.

Optionally, in some embodiments, the resource request message further carries a signal strength/interference strength of other relay devices measured by the relay device.

It should be understood that the network device to which the relay device accesses may determine, based on the signal strength/interference strength of other adjacent relay devices reported by the relay device, whether to adjust resources of other adjacent relay devices or adjust a transmit power between the other adjacent relay devices and the network device, etc.

Optionally, in some embodiments, the resource request message further carries a time window used by other relay devices measured by the relay device.

It should be understood that based on the time window used by other relay devices of the relay device, the network device may determine a time window resource configured for the relay device.

Optionally, in some embodiments, the resource request message further carries location information of the relay device. It should be understood that, in the embodiment of the present disclosure, the location information may include latitude and longitude information, or identification information indicating a location of the relay device. Optionally, the location information may also include height information.

Based on the location information of the relay device, the network device may determine which of relay devices neighboring the relay device may cause signal interference to the relay device, thereby configuring appropriate resources for the relay device or scheduling a neighboring relay device of the relay device to evade using a resource configured for the relay device.

Optionally, in some embodiments, the access link resource requirement information of the relay device includes at least one of the following: a resource not being indicated in a time window to be used for backhaul transmission; an access link resource from the relay device to a terminal device; an access link resource from the terminal device to the relay device; a backhaul resource from the relay device to a lower-level relay device accessing the relay device; a backhaul resource from the lower-level relay device accessing the relay device to the relay device.

It should be understood that when the resource not being indicated in the time window to be used for backhaul transmission is configured for the relay device, the relay device may configure an access link resource between the relay device and the terminal device and a backhaul resource between the relay device and the lower-level relay device, based on the resource not being indicated to be used for backhaul transmission. It should be understood that the lower-level relay device here is a next relay device in a path along which a signal from the relay device is transmitted to the terminal device; or the last relay device before the relay device in a path along which a signal of the terminal device is transmitted to the relay device.

It should be understood that, based on the access link resource requirement information of the relay device, the network device may configure the relay device with an access link resource between the terminal device and the relay device, and a backhaul resource between the relay device and the lower-level relay device.

A corresponding resource is configured for a link between the relay device and the terminal device accessing the relay device or a link between the lower-level relay device and the relay device.

Optionally, in some embodiments, the access link resource requirement information of the relay device may also include at least one of the following: the number of access link resources from the relay device to a terminal device; the number of access link resources from the terminal device to the relay device; the number of backhaul resources from the relay device to the lower-level relay device accessing the relay device; the number of backhaul resources from the lower-level relay device accessing the relay device to the relay device.

Of course, it should be understood that the access link resource requirement information of the relay device may also be a combination of the above two kinds of manners.

Optionally, in some embodiments, before step S210, the method further includes: determining an access link resource of the relay device based on at least one of cache information of the relay device and a quality of an access link of the relay device.

Specifically, the cache information of the relay device may include at least one of: cache information of an access link of the relay device and a cache status report reported by a terminal device under the relay device.

The quality of the access link of the relay device may include at least one of: a quality of an access link from the relay device to a terminal, a quality of an access link from the terminal to the relay device, and a quality of a backhaul link from the relay device to a lower-level relay device accessing the relay device, and a quality of a backhaul link from the lower-level relay device accessing the relay device to the relay device.

Optionally, after step S210, the method may further include receiving a resource allocated by the network device based on the resource request message.

When the resource allocated by the network device based on the resource request message is received, the relay device may perform a corresponding operation on the allocated resource. Specific implementation thereof is described in related art, and is not repeated here the embodiments of the present disclosure.

FIG. 3 is a flowchart of a method of scheduling a relay resource according to an embodiment of the present disclosure. The method is applied to the network device to which the relay device accesses. As shown in FIG. 3, the method may include S310-S320.

S310: receiving a resource request message of a relay device.

The resource request message carries at least one of the following resource requirements information: backhaul resource requirement information of the relay device, and access link resource requirement information of the relay device.

S320: scheduling a resource for the relay device based on the resource request message.

In the embodiments of the present disclosure, the network device schedules a relay resource for the relay device based on the resource request of the relay device, thereby effectively ensuring a load or a link quality of the relay device and improving the robustness of relay communication.

Optionally, in some embodiments, the step S320 may be specifically implemented as: based on the resource request message, allocating a resource to the relay device.

In the embodiments of the present disclosure, the network device may directly allocate a resource to the relay device based on the resource request of the relay device.

Optionally, in some embodiments, the step S320 may be specifically implemented as: based on the resource request message, scheduling a neighboring relay device of the relay device to adjust a used resource, so as to evade a resource requested by the relay device.

In the embodiment of the present disclosure, the network device may schedule, based on the resource request of the relay device, the neighboring relay device of the relay device to evade the resource requested by the relay device.

Optionally, in some embodiments, the step S320 may be specifically implemented as: allocating, based on the resource request message, a target resource to the relay device; scheduling a neighboring relay device of the relay device to stop using the target resource.

In the embodiment of the present disclosure, the network device may allocate a resource to the relay device based on the resource request of the relay device, and schedule the neighboring relay device of the relay device to evade the resource allocated to the relay device.

Optionally, in some embodiments, the backhaul resource requirement information of the relay device includes at least one of the following: a backhaul resource from the network device to the relay device in a time window; a backhaul resource from the relay device to the network device in a time window.

Optionally, in some embodiments, the resource request message further carries a signal strength/an interference strength of other relay devices measured by the relay device.

Optionally, in some embodiments, the resource request message further carries a time window used by other relay devices measured by the relay device.

Optionally, in some embodiments, the resource request message further carries location information of the relay device.

Optionally, in some embodiments, the access link resource requirement information of the relay device includes at least one of the following: a resource not being indicated in a time window to be used for backhaul transmission; an access link resource from the relay device to a terminal device; an access link resource from the terminal device to the relay device; a backhaul resource from the relay device to a lower-level relay device accessing the relay device; a backhaul resource from the lower-level relay device accessing the relay device to the relay device.

Optionally, in some embodiments, the access link resource requirement information of the relay device may also include at least one of the following: the number of access link resources from the relay device to a terminal device; the number of access link resources from the terminal device to the relay device; the number of backhaul resources from the relay device to the lower-level relay device accessing the relay device; the number of backhaul resources from the lower-level relay device accessing the relay device to the relay device.

Of course, in some embodiments, the access link resource requirement information of the relay device may also be a combination of the above two kinds of manners.

Optionally, in some embodiments, an access link resource of the relay device is determined based on at least one of cache information of the relay device and a quality of an access link of the relay device.

Optionally, the cache information of the relay device includes at least one of: cache information of an access link of the relay device and a cache status report reported by a terminal device under the relay device.

Optionally, in some embodiments, the quality of the access link of the relay device includes at least one of: a quality of an access link from the relay device to a terminal, a quality of an access link from the terminal to the relay device, and a quality of a backhaul from the relay device to a lower-level relay device accessing the relay device, and a quality of a backhaul from the lower-level relay device accessing the relay device to the relay device.

It should be understood that a specific form of the resource request message received by the network device may be obtained by referring to the resource request message sent by the relay device in the embodiment shown in FIG. 2, and the network device may achieve a corresponding resource schedule based on the received resource request message, which is not described herein in details.

FIG. 4 is a schematic structural diagram of a relay device 400 according to an embodiment of the present disclosure. As shown in FIG. 4, the relay device 400 may include a sending module 410 used to send a resource request message to a network device to which the relay device accesses.

The resource request message carries at least one of the following resource requirements information: backhaul resource requirement information of the relay device; access link resource requirement information of the relay device.

Optionally, in some embodiments, the backhaul resource requirement information of the relay device includes at least one of the following: a link resource from the network device to the relay device in a time window; a link resource from the relay device to the network device in a time window.

Optionally, in some embodiments, the resource request message further carries a signal strength/interference strength of other relay devices measured by the relay device.

Optionally, in some embodiments, the resource request message further carries a time window used by other relay devices measured by the relay device.

Optionally, in some embodiments, the resource request message further carries location information of the relay device.

Optionally, in some embodiments, the access link resource requirement information of the relay device includes at least one of the following: a resource not being indicated in a time window to be used for backhaul transmission; an access link resource from the relay device to a terminal device; an access link resource from the terminal device to the relay device; a backhaul resource from the relay device to a lower-level relay device accessing the relay device; a backhaul resource from the lower-level relay device accessing the relay device to the relay device.

Optionally, in some embodiments, the access link resource requirement information of the relay device also includes at least one of the following: the number of access link resources from the relay device to a terminal device; the number of access link resources from the terminal device to the relay device; the number of backhaul resources from the relay device to the lower-level relay device accessing the relay device; the number of backhaul resources from the lower-level relay device accessing the relay device to the relay device.

Optionally, in some embodiments, the relay device 400 further includes a determining module 420. The determining module 420 is used to determine an access link resource of the relay device based on at least one of cache information of the relay device and a quality of an access link of the relay device.

Optionally, in some embodiments, the cache information of the relay device includes at least one of: cache information of an access link of the relay device and a cache status report reported by a terminal device under the relay device.

Optionally, in some embodiments, the quality of the access link of the relay device includes at least one of: a quality of an access link from the relay device to a terminal, a quality of an access link from the terminal to the relay device, and a quality of a backhaul link from the relay device to a lower-level relay device accessing the relay device, and a quality of a backhaul link from the lower-level relay device accessing the relay device to the relay device.

Optionally, in some embodiments, the relay device 400 further includes: a receiving module 430, used to receive a resource allocated by the network device based on the resource request message.

The relay device provided in the embodiment of the present disclosure may implement the various processes implemented by the relay device in the method embodiment of FIG. 2. To avoid repetition, detailed description thereof is not given herein again.

Figure 5:
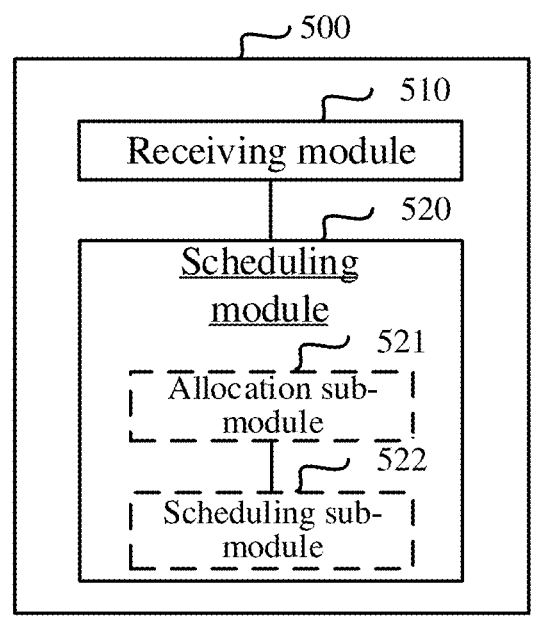
FIG. 5 is a schematic structural diagram of a network device according to an embodiment of the present disclosure.

FIG. 5 is a schematic structural diagram of a network device 500 according to an embodiment of the present disclosure. As shown in FIG. 5, the network device 500 may include a receiving module 510, used to receive a resource request message of a relay device, wherein the resource request message carries at least one of the following resource requirements information: backhaul resource requirement information of the relay device, and access link resource requirement information of the relay device; a scheduling module 520, used to schedule a resource for the relay device based on the resource request message.

Optionally, in some embodiments, the scheduling module 520 includes an allocation sub-module 521. The allocation sub-module 521 is specifically used to allocate a resource to the relay device based on the resource request message.

Optionally, in some embodiments, the scheduling module 520 includes a scheduling sub-module 522. The scheduling sub-module 522 is specifically used to: based on the resource request message, schedule a neighboring relay device of the relay device to adjust a used resource, so as to evade a resource requested by the relay device.

Optionally, in some embodiments, the scheduling module 520 includes an allocation sub-module 521 and a scheduling sub-module 522, wherein the allocation sub-module 521 is used to allocate, based on the resource request message, a target resource to the relay device; the scheduling sub-module 522 is used to schedule a neighboring relay device of the relay device to stop using the target resource.

Optionally, in some embodiments, the backhaul resource requirement information of the relay device includes at least one of the following: a backhaul resource from the network device to the relay device in a time window; a backhaul resource from the relay device to the network device in a time window.

Optionally, in some embodiments, the resource request message further carries a signal strength/an interference strength of other relay devices measured by the relay device.

Optionally, in some embodiments, the resource request message further carries a time window used by other relay devices measured by the relay device.

Optionally, in some embodiments, the resource request message further carries location information of the relay device.

Optionally, in some embodiments, the access link resource requirement information of the relay device includes at least one of the following: a resource not being indicated in a time window to be used for backhaul transmission; an access link resource from the relay device to a terminal device; an access link resource from the terminal device to the relay device; a backhaul resource from the relay device to a lower-level relay device accessing the relay device; a backhaul resource from the lower-level relay device accessing the relay device to the relay device.

Optionally, in some embodiments, the access link resource requirement information of the relay device further includes at least one of the following: the number of access link resources from the relay device to a terminal device; the number of access link resources from the terminal device to the relay device; the number of backhaul resources from the relay device to the lower-level relay device accessing the relay device; the number of backhaul resources from the lower-level relay device accessing the relay device to the relay device.

Optionally, in some embodiments, an access link resource of the relay device is determined based on at least one of cache information of the relay device and a quality of an access link of the relay device.

Optionally, in some embodiments, the cache information of the relay device includes at least one of: cache information of an access link of the relay device and a cache status report reported by a terminal device under the relay device.

Optionally, in some embodiments, the quality of the access link of the relay device includes at least one of: a quality of an access link from the relay device to a terminal, a quality of an access link from the terminal to the relay device, and a quality of a backhaul link from the relay device to a lower-level relay device accessing the relay device, and a quality of a backhaul link from the lower-level relay device accessing the relay device to the relay device.

The network device provided by the embodiment of the present disclosure may implement each process implemented by the network device in the method embodiment of FIG. 3. To avoid repetition, details thereof are not described herein again.

Figure 6:
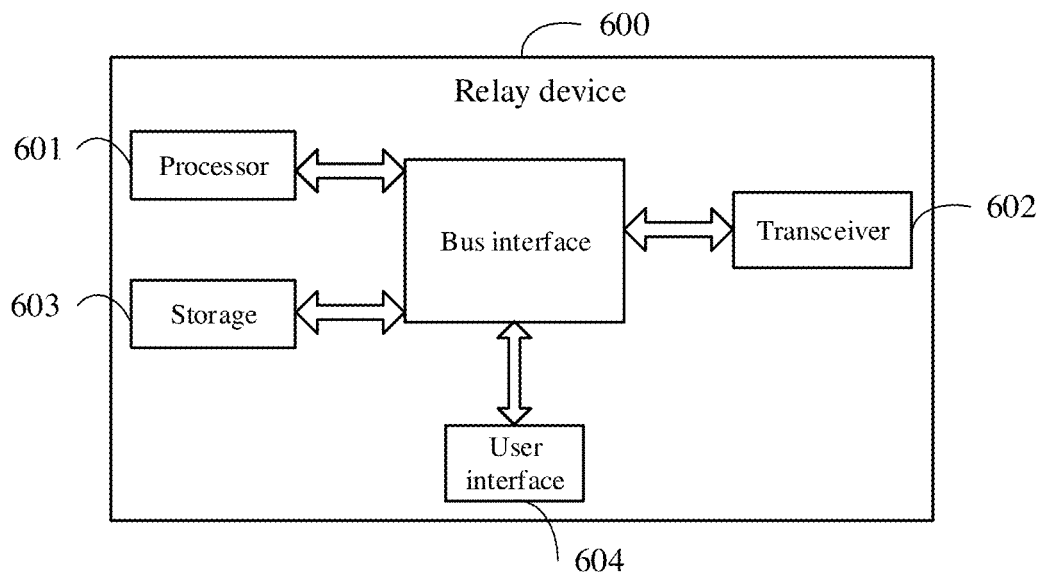
FIG. 6 is a schematic structural diagram of a relay device according to another embodiment of the present disclosure.

Referring to FIG. 6. FIG. 6 is a structural diagram of a relay device applied in an embodiment of the present disclosure, which may implement the details of the method shown in FIG. 1 and achieve the same effect. As shown in FIG. 6, the relay device 600 includes a processor 601, a transceiver 602, a storage 603, a user interface 604, and a bus interface.

In the embodiment of the present disclosure, the relay device 600 further includes a computer program stored on the storage 603 and executable by the processor 601. When the computer program is executed by the processor 601, the processor 601 implements the following steps: sending a resource request message to a network device to which a relay device accesses, wherein the resource request message carries at least one of the following resource requirements information: backhaul resource requirement information of the relay device; access link resource requirement information of the relay device.

In FIG. 6, a bus architecture may include any number of interconnected buses and bridges. Various circuits, specifically, one or more processors represented by the processor 601 and a storage represented by the storage 603, are linked together. The bus architecture may also link various other circuits such as peripherals, voltage regulators and power management circuits, which are well known in the art, and therefore a further description thereof is omitted herein. The bus interface provides interfaces. The transceiver 602 may be a plurality of elements, that is, includes a transmitter and a receiver, to provide units used to communicate with various other apparatuses over a transmission medium. For different user equipments, the user interface 604 can also be an interface capable of externally/internally connecting the required devices which including but not limited to a keypad, a display, a speaker, a microphone, a joystick, and the like.

The processor 601 is responsible for managing the bus architecture and general processing, and the storage 603 can store data used by the processor 601 when performing operations.

The processor 601 may also implement the various processes implemented by the relay device in the method embodiment of FIG. 2. To avoid repetition, details are not described herein again.

The embodiments of the present disclosure also provide a computer readable storage medium, a computer program is stored on the computer readable storage medium. When the computer program is executed by a processor, the processor implements various processes in the method embodiment shown in FIG. 2, and the same technical effect may be achieved, which will not be repeated herein to avoid repetition. The computer readable storage medium may be, for example, a read-only memory (Read-Only Memory, ROM), a random access memory (Random Access Memory, RAM), a magnetic disk or an optical disk, etc.

Figure 7:
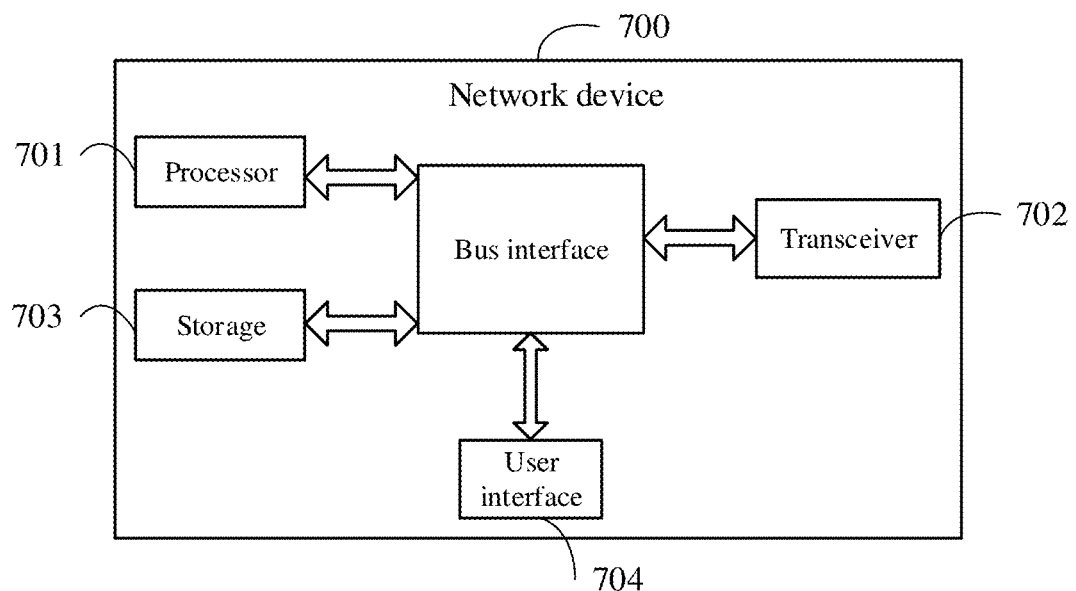
FIG. 7 is a schematic structural diagram of a network device according to another embodiment of the present disclosure.

Referring to FIG. 7. FIG. 7 is a structural diagram of a network device applied in an embodiment of the present disclosure, which may implement the details of the method of the embodiment shown in FIG. 3 and achieve the same effect. As shown in FIG. 7, the network device 700 includes a processor 701, a transceiver 702, a storage 703, a user interface 704, and a bus interface.

In the embodiment of the present disclosure, the network device 700 further includes: a computer program stored in the storage 703 and executable by the processor 701. When the computer program is executed by the processor 701, the processor 701 implements the following steps: receiving a resource request message of a relay device, wherein the resource request message carries at least one of the following resource requirements information: backhaul resource requirement information of the relay device, and access link resource requirement information of the relay device; scheduling a resource for the relay device based on the resource request message.

In FIG. 7, a bus architecture may include any number of interconnected buses and bridges. Various circuits, specifically, one or more processors represented by the processor 701 and a storage represented by the storage 703, are linked together. The bus architecture may also link various other circuits such as peripherals, voltage regulators and power management circuits, which are well known in the art, and therefore a further description thereof is omitted herein. The bus interface provides interfaces. The transceiver 702 may be a plurality of elements, that is, includes a transmitter and a receiver, to provide units used to communicate with various other apparatuses over a transmission medium. For different user equipments, the user interface 704 can also be an interface capable of externally/internally connecting the required devices which including but not limited to a keypad, a display, a speaker, a microphone, a joystick, and the like.

The processor 701 is responsible for managing the bus architecture and general processing, and the storage 703 can store data used by the processor 701 when performing operations.

The processor 701 may also implement the various processes implemented by the network device in the method embodiment of FIG. 3. To avoid repetition, details are not described herein again.

The embodiments of the present disclosure also provide a computer readable storage medium, a computer program is stored on the computer readable storage medium. When the computer program is executed by a processor, the processor implements various processes in the method embodiment shown in FIG. 3, and the same technical effect may be achieved, which will not be repeated herein to avoid repetition. The computer readable storage medium may be, for example, a read-only memory (Read-Only Memory, ROM), a random access memory (Random Access Memory, RAM), a magnetic disk or an optical disk, etc.

It should be noted that, such terms as "including" or "having" or any other variations thereof herein are intended to encompass a non-exclusive inclusion, such that a process, method, article, or device that includes a plurality of elements includes not only those elements but also other elements not explicitly listed, or elements that are inherent to such a process, method, article, or device. An element after the phrase "comprising a . . . " does not exclude presence of additional identical elements in the process, method, article, or device that includes the element, if without further limitation.

Through the description of the foregoing embodiments, it is clear to those skilled in the art that the foregoing method embodiments may be implemented by software plus a necessary general hardware platform, and certainly may also be implemented by hardware, but in many cases, the former is a better implementation. Based upon such understanding, the technical solutions of the present disclosure essentially or a part thereof contributing to the relevant art may be embodied in the form of a computer software product which may be stored in a storage medium (e.g., a ROM/RAM, a magnetic disk or an optical disk) and which includes several instructions to cause a terminal (which may be a personal computer, a server, an air-conditioner or a network device, etc.) to perform the methods described in the various embodiments of the present disclosure.

The aforementioned are merely specific implementations of the present disclosure, but the protection scope of the present disclosure is by no means limited thereto. The specific embodiments provided above are only illustrative, but not restrictive. Those skilled in the art may make many forms without departing from the spirit of the present disclosure and the protection scope of the claims under enlightenment of the present disclosure. All of the forms are within the protection scope of the present disclosure.

What is claimed is:

1. A method of requesting a relay resource, wherein the method is applied to a relay device and comprises:
   sending a resource request message to a network device to which a relay device accesses; and
   receiving a resource allocated by the network device based on the resource request message,
   wherein the resource request message carries at least one of following resource requirements information:
   backhaul resource requirement information of the relay device,
   access link resource requirement information of the relay device;
   wherein, the resource request message further carries a signal strength/an interference strength of other relay devices measured by the relay device;
   and/or,
   the resource request message further carries a time window used by other relay devices measured by the relay device;
   and/or,
   the resource request message further carries location information of the relay device.

2. The method according to claim 1, wherein, the backhaul resource requirement information of the relay device comprises at least one of following:
   a backhaul resource from the network device to the relay device in a time window;

a backhaul resource from the relay device to the network device in a time window;

or, the access link resource requirement information of the relay device comprises at least one of following:

a resource not being indicated in a time window to be used for backhaul transmission;

an access link resource from the relay device to a terminal device;

an access link resource from a terminal device to the relay device;

a backhaul resource from the relay device to a lower-level relay device accessing the relay device;

a backhaul resource from the lower-level relay device accessing the relay device to the relay device.

3. The method according to claim 2, wherein the access link resource requirement information of the relay device further comprise at least one of following:

the number of access link resources from the relay device to a terminal device;

the number of access link resources from a terminal device to the relay device;

the number of backhaul resources from the relay device to the lower-level relay device accessing the relay device;

the number of backhaul resources from the lower-level relay device accessing the relay device to the relay device.

4. The method according to claim 2, wherein before sending a resource request message to a network device to which a relay device accesses, the method further comprises:

determining an access link resource of the relay device based on at least one of cache information of the relay device and a quality of an access link of the relay device, wherein, the cache information of the relay device comprises at least one of:

cache information of an access link of the relay device and a cache status report reported by a terminal device under the relay device;

the quality of the access link of the relay device comprises at least one of:

a quality of an access link from the relay device to a terminal, a quality of an access link from the terminal to the relay device, a quality of a backhaul from the relay device to a lower-level relay device accessing the relay device, and a quality of a backhaul from a lower-level relay device accessing the relay device to the relay device.

5. A method of scheduling a relay resource, wherein the method is applied to a network device accessed to by a relay device, and the method comprises:

receiving a resource request message of a relay device, wherein the resource request message carries at least one of following resource requirements information: backhaul resource requirement information of the relay device, and access link resource requirement information of the relay device;

scheduling a resource for the relay device based on the resource request message;

wherein, the resource request message further carries a signal strength/an interference strength of other relay devices measured by the relay device;

and/or, the resource request message further carries a time window used by other relay devices measured by the relay device;

and/or, the resource request message further carries location information of the relay device.

6. The method according to claim 5, wherein, scheduling the resource for the relay device based on the resource request message comprises:

allocating a resource to the relay device based on the resource request message;

or, scheduling the resource for the relay device based on the resource request message comprises:

based on the resource request message, scheduling a neighboring relay device of the relay device to adjust a used resource to evade a resource requested by the relay device;

or, scheduling the resource for the relay device based on the resource request message comprises:

allocating, based on the resource request message, a target resource to the relay device;

scheduling a neighboring relay device of the relay device to stop using the target resource.

7. The method according to claim 5, wherein, the backhaul resource requirement information of the relay device comprises at least one of following:

a backhaul resource from the network device to the relay device in a time window;

a backhaul resource from the relay device to the network device in a time window;

or, the access link resource requirement information of the relay device comprises at least one of following:

a resource not being indicated in a time window to be used for backhaul transmission;

an access link resource from the relay device to a terminal device;

an access link resource from the terminal device to the relay device;

a backhaul resource from the relay device to a lower-level relay device accessing the relay device;

a backhaul resource from a lower-level relay device accessing the relay device to the relay device.

8. The method according to claim 7, wherein the access link resource requirement information of the relay device further comprise at least one of following:

the number of access link resources from the relay device to a terminal device;

the number of access link resources from a terminal device to the relay device;

the number of backhaul resources from the relay device to a lower-level relay device accessing the relay device;

the number of backhaul resources from a lower-level relay device accessing the relay device to the relay device.

9. The method according to claim 7, wherein, an access link resource of the relay device is determined based on at least one of cache information of the relay device and a quality of an access link of the relay device, wherein, the cache information of the relay device comprises at least one of following:

cache information of an access link of the relay device and a cache status report reported by a terminal device under the relay device;

the quality of the access link of the relay device comprises at least one of following:

a quality of an access link from the relay device to a terminal, a quality of an access link from the terminal to the relay device, a quality of a backhaul from the relay device to a lower-level relay device accessing the relay device, and a quality of a backhaul from a lower-level relay device accessing the relay device to the relay device.

10. A relay device, comprising:
a storage, a processor, and a computer program stored on the storage and executable by the processor, wherein when the computer program is executed by the processor, the processor implements a method of requesting a relay resource, the method comprises:
sending a resource request message to a network device to which a relay device accesses; and
receiving a resource allocated by the network device based on the resource request message,
wherein the resource request message carries at least one of following resource requirements information:
backhaul resource requirement information of the relay device,
access link resource requirement information of the relay device;
wherein, the resource request message further carries a signal strength/an interference strength of other relay devices measured by the relay device;
and/or,
the resource request message further carries a time window used by other relay devices measured by the relay device;
and/or,
the resource request message further carries location information of the relay device.

11. The relay device according to claim 10, wherein, the backhaul resource requirement information of the relay device comprises at least one of following:
a backhaul resource from the network device to the relay device in a time window;
a backhaul resource from the relay device to the network device in a time window;
or,
the access link resource requirement information of the relay device comprises at least one of following:
a resource not being indicated in a time window to be used for backhaul transmission;
an access link resource from the relay device to a terminal device;
an access link resource from a terminal device to the relay device;
a backhaul resource from the relay device to a lower-level relay device accessing the relay device;
a backhaul resource from the lower-level relay device accessing the relay device to the relay device.

12. The relay device according to claim 11, wherein the access link resource requirement information of the relay device further comprise at least one of following:
the number of access link resources from the relay device to a terminal device;
the number of access link resources from a terminal device to the relay device;
the number of backhaul resources from the relay device to the lower-level relay device accessing the relay device;
the number of backhaul resources from the lower-level relay device accessing the relay device to the relay device.

13. The relay device according to claim 11, wherein when the computer program is executed by the processor, the processor further implements: before sending a resource request message to a network device to which a relay device accesses,
determining an access link resource of the relay device based on at least one of cache information of the relay device and a quality of an access link of the relay device,
wherein, the cache information of the relay device comprises at least one of:
cache information of an access link of the relay device and a cache status report reported by a terminal device under the relay device;
the quality of the access link of the relay device comprises at least one of:
a quality of an access link from the relay device to a terminal, a quality of an access link from the terminal to the relay device, a quality of a backhaul from the relay device to a lower-level relay device accessing the relay device, and a quality of a backhaul from a lower-level relay device accessing the relay device to the relay device.

14. A network device, comprising:
a storage, a processor, and a computer program stored on the storage and executable by the processor, wherein when the computer program is executed by the processor, the processor implements steps of the method according to claim 5.

15. The network device according to claim 14, wherein, the backhaul resource requirement information of the relay device comprises at least one of following:
a backhaul resource from the network device to the relay device in a time window;
a backhaul resource from the relay device to the network device in a time window;
or,
the access link resource requirement information of the relay device comprises at least one of following:
a resource not being indicated in a time window to be used for backhaul transmission;
an access link resource from the relay device to a terminal device;
an access link resource from the terminal device to the relay device;
a backhaul resource from the relay device to a lower-level relay device accessing the relay device;
a backhaul resource from a lower-level relay device accessing the relay device to the relay device.

16. A non-transitory computer-readable storage medium, wherein a computer program is stored on the computer-readable storage medium, and when the computer program is executed by a processor, the processor implements steps of the method according to claim 1.

17. A non-transitory computer-readable storage medium, wherein a computer program is stored on the computer-readable storage medium, and when the computer program is executed by a processor, the processor implements steps of the method according to claim 5.

* * * * *